United States Patent [19]
Shalit

[11] Patent Number: 5,170,914
[45] Date of Patent: Dec. 15, 1992

[54] DISPENSING MECHANISM WITH QUICKLY CHANGEABLE AUGER
[75] Inventor: H. Stanley Shalit, Seminole, Fla.
[73] Assignee: Klockner Bartelt, Inc., Sarasota, Fla.
[21] Appl. No.: 825,104
[22] Filed: Jan. 24, 1992
[51] Int. Cl.⁵ .................................. G01F 11/20
[52] U.S. Cl. ................... 222/413; 403/341; 403/349
[58] Field of Search ............ 222/412, 413; 403/341, 403/348, 349

[56] References Cited
U.S. PATENT DOCUMENTS

| 402,132 | 4/1889 | Berry | 403/349 |
| 709,400 | 9/1902 | Fitzpatrick | 403/341 |
| 1,180,773 | 4/1916 | Hirschman | 222/413 |
| 2,686,618 | 8/1954 | Mateer | 222/413 X |
| 4,895,274 | 1/1990 | Morimoto et al. | 222/413 X |
| 4,938,391 | 7/1990 | Grundler | 222/413 X |

FOREIGN PATENT DOCUMENTS

| 18002 | of 1904 | Australia | 403/341 |
| 22337 | of 1913 | United Kingdom | 403/341 |
| 466232 | 5/1937 | United Kingdom | 403/341 |

Primary Examiner—Andres Kashnikow
Assistant Examiner—Kenneth Bomberg
Attorney, Agent, or Firm—Leydig, Voit & Mayer

[57] ABSTRACT

A feed auger is attached to the vertical drive shaft of a dispensing mechanism by a quick disconnect coupling which enables relatively high torque to be transmitted between the shaft and the auger.

5 Claims, 2 Drawing Sheets

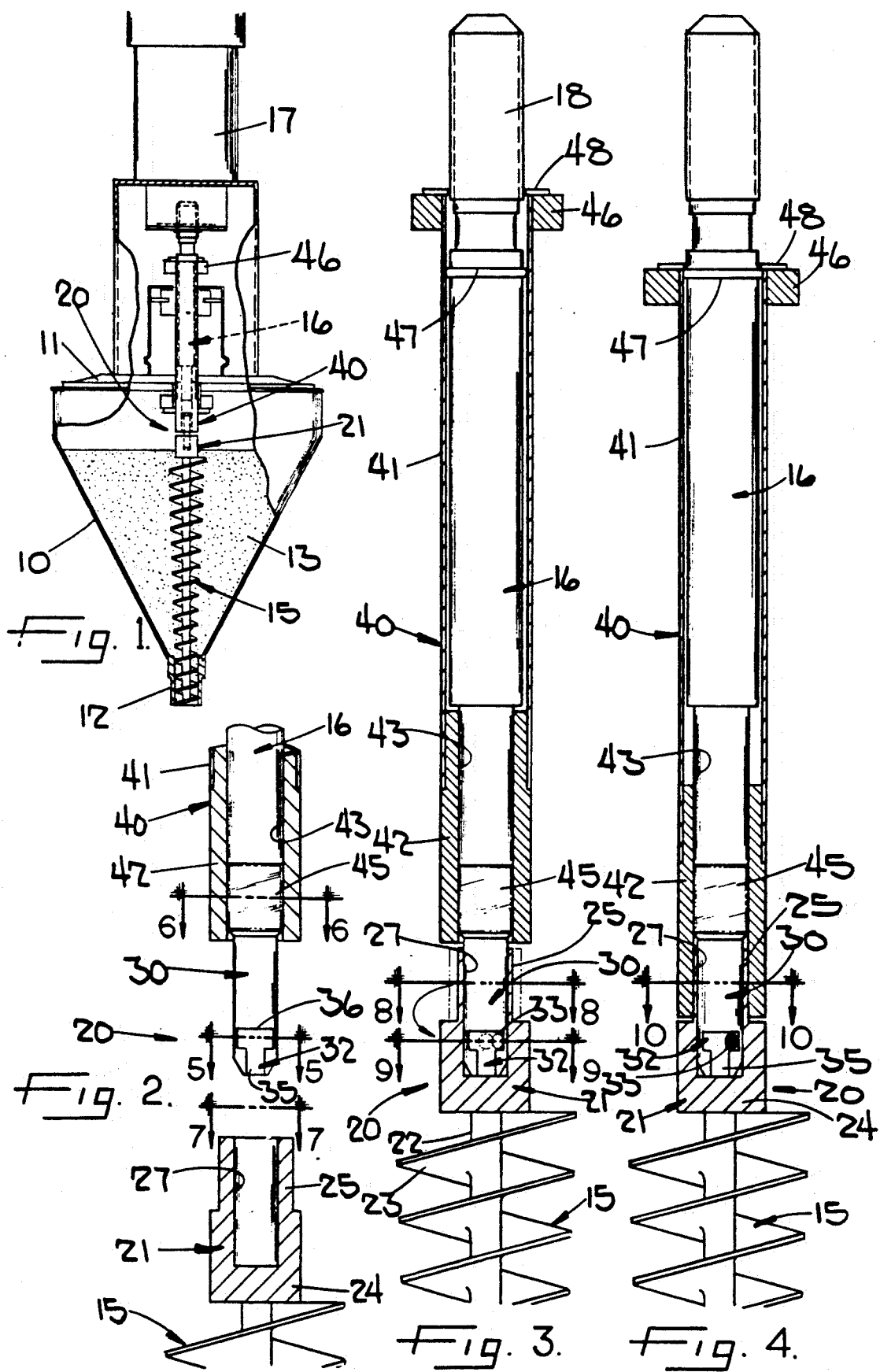

DISPENSING MECHANISM WITH QUICKLY CHANGEABLE AUGER

BACKGROUND OF THE INVENTION

This invention relates to a device for dispensing material from a supply hopper into containers in which the material is to be packaged. More particularly, the invention relates to a dispensing device in which the material in the hopper is dispensed in measured quantities by a vertically extending and power-rotated auger.

In such a dispenser, the upper end of the auger is connected to the lower end of a drive shaft which may be rotated either intermittently or continuously by a motor or other drive mechanism. During each revolution of the auger, a predetermined quantity of material is advanced downwardly and is discharged out of the lower end of the hopper by the auger.

When the different quantity or type of material is to be dispensed, it is often necessary to replace the auger with a different auger. Thus, there exists a need to be able to quickly disconnect the auger from the drive shaft of the dispensing device and to quickly connect another auger to the shaft.

In large dispensers, in dispensers that handle dense material, and in rapidly cycling intermittent dispensers, significant torque is transmitted between the drive shaft and the auger and thus the connection between the two must be capable of carrying such torque.

In present commercially available dispensers with vertical augers, the drive connection between the lower end of the shaft and the upper end of the auger is formed by a radially extending roll pin. The roll pin is not capable of transmitting high torque nor does it lend itself to quick and easy changeover of the auger and particularly when the auger is large and heavy.

SUMMARY OF THE INVENTION

The general aim of the present invention is to provide a dispensing mechanism with a new and improved drive shaft/auger coupling which is capable of transmitting high torque from the shaft to the auger while enabling the auger to be connected to and disconnected from the shaft in a quick and easy manner.

A more detailed object of the invention is to achieve the foregoing by providing a unique coupling which first enables the auger to be hung from the drive shaft and which then enables the two to be connected for rotation in unison under high torque conditions.

Still another object is to provide a coupling which, when selectively released, enables the auger to turn relative to the drive shaft to permit the auger to be attached in hanging relation with the shaft. When the coupling is engaged, it prevents the auger from turning relative to the shaft and forms a strong and tight torque-transmitting connection between the shaft and the auger.

The invention also resides in the relatively simple and trouble-free construction of the components which releasably couple the auger and the shaft.

These and other objects and advantages of the invention will become more apparent from the following detailed description when taken in conjunction with the accompanying drawings.

BRIEF DESCRIPTION OF THE DRAWINGS

FIG. 1 is a vertical sectional view of a typical dispenser equipped with a quick-connect, high torque auger/shaft coupling incorporating the unique features of the present invention.

FIG. 2 is a fragmentary cross-sectional view showing the auger completely detached from the shaft.

FIG. 3 is an enlarged view of certain components illustrated in FIG. 1 and shows the auger partially attached to the shaft.

FIG. 4 is a view similar to FIG. 3 but shows the auger fully attached to the shaft.

DETAILED DESCRIPTION OF THE PREFERRED EMBODIMENT

Figure 5:
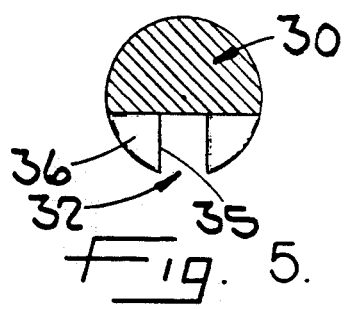
FIGS. 5 and 6 are enlarged cross-sections taken substantially along the lines 5—5 and 6—6, respectively, of FIG. 2.
Figure 6:
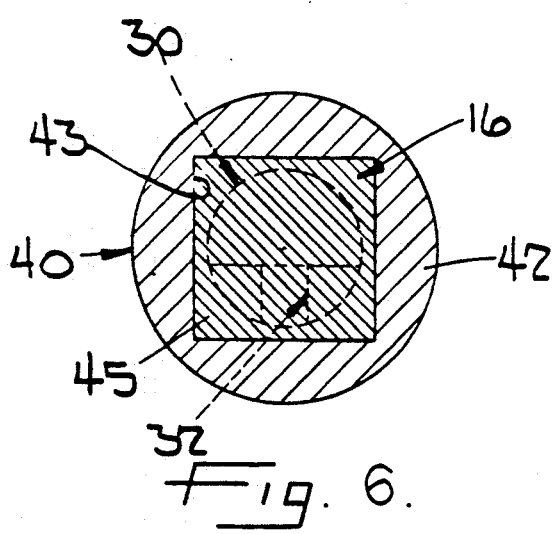

For purposes of illustration, the invention has been shown in the drawings as embodied in a dispensing device comprising an inverted cone-shaped hopper 10 with a removable cover 11 and formed at its lower end with a centrally disposed outlet or spout 12 through which the material 13 in the hopper is dispensed and deposited in containers such as pouches (not shown) advanced beneath the spout. Herein, the material is dispensed by means of a feed screw or auger 15 disposed along the axis of the hopper 10 and extending from a point within the body of material 13 and into the spout 12.

The auger 15 is turned intermittently through predetermined angles to dispense measured quantities of the material 13 and, for this purpose, the upper end portion of the auger is secured to the lower end portion of a shaft 16 extending along the axis of the hopper and driven by a motor (not shown) through a suitable indexing mechanism 17. The upper end portion 18 of the shaft is threaded and is normally secured to the indexing mechanism by a lock nut (not shown). By loosening the nut, the shaft may be turned and adjusted vertically to establish the vertical position of the auger within the spout 12.

In accordance with the present invention, the auger 15 is attached to the shaft 16 by a unique quick disconnect coupling 20 which is capable of transmitting high torque from the shaft to the auger. The coupling is particularly characterized in that it enables the auger to be hung preliminarily from the shaft before the two are connected for rotation in unison. When removal of the auger is required, the coupling allows the auger to remain hanging from the shaft as the drive connection is released. This simplifies installation and removal of the auger and particularly when the auger is large and heavy.

Figure 7:
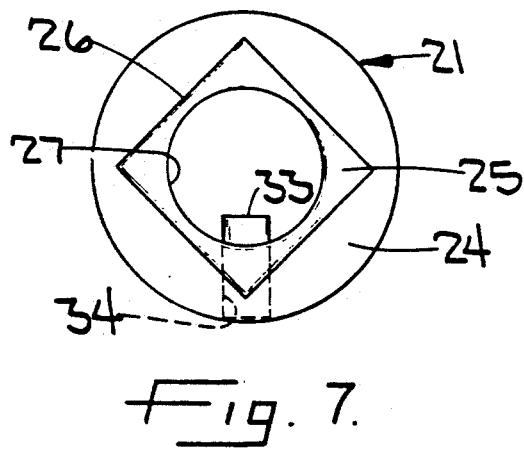
FIG. 7 is an enlarged top plan view of the upper end of the auger as seen along the line 7—7 of FIG. 2.
Figure 8:
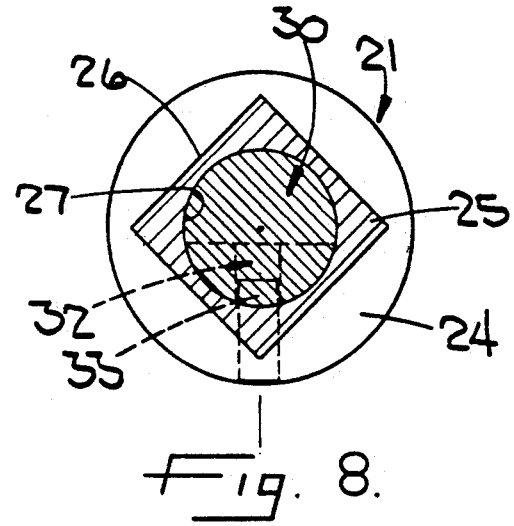
FIG. 8 is an enlarged cross-section taken substantially along the line 8—8 of FIG. 3 and shows the initial step of attaching the auger to the drive shaft.

More specifically, the drive coupling 20 is formed in part by a sleeve 21 which is secured to the upper end of the shaft 22 (FIG. 3) of the auger 15, the helical flight 23 of the auger also being attached to the shaft 22. The sleeve 21 includes a cylindrical lower end portion 24 and, in carrying out the invention, an upper end portion 25 whose exterior defines a polygonal driving surface 26 (FIGS. 7 and 8). In this particular instance, the exterior of the upper end portion 25 of the sleeve 21 is square and thus the polygonal driving surface 26 is defined by four flat sides which join each other at right angles. The interior of the sleeve is defined by a cylindrical blind bore 27.

The coupling 20 is further formed by a cylindrical shank 30 formed integrally with and extending downwardly from the lower end of the shaft 16 and sized to telescope slidably but snugly onto the bore 27 in the sleeve 21. Pursuant to the invention, the shank and the sleeve include coacting means which enable the sleeve (and the attached auger 15) to hang from the shank (and the attached shaft 16). Herein, these means comprise a generally T-shaped slot 32 formed in the lower end portion of the shank 30 along with a pin 33 fixed rigidly within a hole 34 (FIG. 9) in the cylindrical portion 24 of the sleeve 21 and projecting radially into the bore 27 of the sleeve. .The T-shaped slot 32 includes a vertical stem 35 (FIGS. 2 and 5) opening radially out of one side of the shank 30 and axially out of the lower end of the shank and formed by milling a vertical slot in one side of the shank. The T-shaped slot also includes a cross portion 36 located at the upper end of the stem and formed by milling a horizontal slot in the side of the shank. The depth of the T-shaped slot 32 is slightly less than the radius of the shank 30 as is apparent from FIG. 5.

Figure 10:
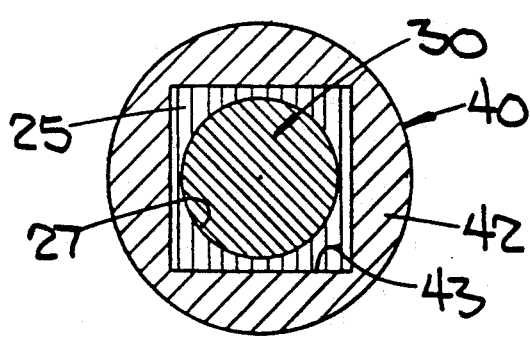
FIG. 10 is an enlarged cross-section taken substantially along the line 10—10 of FIG. 4.

With the foregoing arrangement, the auger 15 may be attached to the shaft 16 by positioning the auger such that the sleeve 21 is spaced below and is aligned axially with the shank 30 as shown in FIG. 2, the sleeve being oriented angularly such that the pin 33 is aligned with the stem 35 of the T-shaped slot 32. The auger then is shifted upwardly to cause the sleeve to telescope onto the shank (see FIGS. 3 and 8) and, as an incident thereto, the pin 33 passes upwardly within the stem 35 of the slot 32 and enters the cross portion 36 thereof. Thereafter, the sleeve is rotated in either direction through about 45 degrees to cause the pin 33 to move out of alignment with the stem 35 and to move into the cross portion 36 (see FIGS. 4 and 10). As a result, the pin becomes captivated against axial movement and causes the auger 15 to hang from the shaft 16.

In order to transmit torque from the shaft 16 to the auger 15, the coupling 20 includes a tube 40 which, when in an active position, rotatably couples the shaft and the auger. When the tube is shifted axially to an inactive position, it releases the auger for rotation relative to the shaft and thus allows the sleeve 21 to be turned to bring the pin 33 into or out of alignment with the stem 35 of the slot 32.

More particularly, the coupling tube 40 includes an elongated tubular member 41 (FIGS. 3 and 4) which is telescoped over a substantial length of the shaft 16. Telescoped into and fixed securely within the lower end of the tubular member is a metal block 42 which is formed with a bore 43 of square cross-section, the bore forming an internal or female polygonal driving surface. The bore 43 of the block 42 receives a complementary male driving surface in the form of a square section 45 formed on the lower end portion of the shaft 16 just above the shank 30.

During attachment of the sleeve 21 to the shank 30, the tube 40 is retracted upwardly to an inactive position shown in FIGS. 2 and 3. To facilitate retraction of the tube, a collar 46 (FIGS. 3 and 4) is attached to the upper end of the tubular member 41 and may be used as a finger grip to lift the tube. Various means may be employed to releasably hold the tube in its retracted inactive position.

Figure 9:
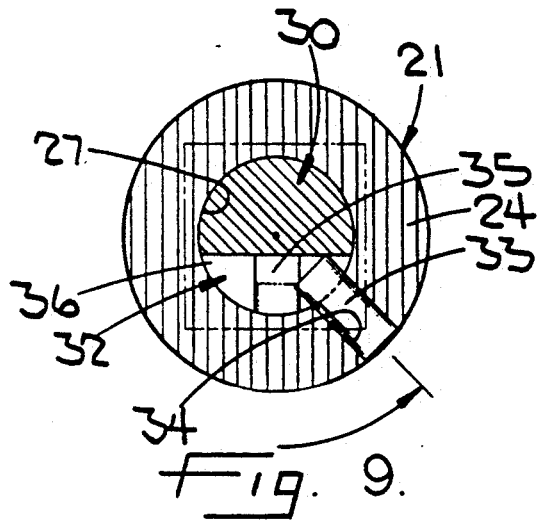
FIG. 9 is an enlarged cross-section taken substantially along the line 9—9 of FIG. 3 and shows an intermediate step of attaching the auger to the shaft.

When the tube 40 is retracted upwardly to its inactive position, the lower end of the block 42 is located adjacent the lower end of the square section 45 of the shaft 16 and is clear of the shank 30 (see FIGS. 2 and 3). As a result, the sleeve 21 may be telescoped upwardly onto the shank and then turned to cause the pin 33 to move into the cross portion 36 of the slot 32. When the sleeve 21 is turned such that the end of the pin 33 stops against the slot 32 as shown in FIG. 9, the square upper end portion 25 of the sleeve is located in angular alignment with the square section 45 of the shaft 16. The tube 40 then is shifted downwardly to cause the square bore 43 in the block 42 to telescope over the square upper end portion 25 of the sleeve 21 while remaining telescoped with the square section 45 of the shaft 16. Thus, the block 42 forms a solid and stiff torque-transmitting connection between the shaft 16 and the auger 15. When the tube 40 is shifted downwardly, a washer 48 which is rigid with the collar 46 engages an O-ring 47 on the upper end portion of the shaft 16 to limit downward movement of the tube (see FIG. 4).

To summarize, installation of the auger 15 is effected while the block 42 of the tube 40 is retracted as shown in FIGS. 2 and 3 and is effected by raising and turning the sleeve 21 to cause the sleeve to telescope over the shank 30 and to cause the pin 33 to enter into and lodge within the cross portion 36 of the slot 32. With the auger 15 thus suspended from the shaft 16, the tube 40 is shifted downwardly to cause the square bore 43 in the block 42 to establish a torque-transmitting connection between the square section 45 of the shaft and the square upper end portion 25 of the sleeve. Removal of the auger may be effected simply by retracting the tube to its inactive position and, during such retraction, the weight of the auger is sustained by the connection formed by the slot 32 and the pin 33. Once the block 42 has been retracted above the upper end of the sleeve 21, the latter may be rotated to bring the pin 33 into alignment with the stem 35 of the slot 32. Thereafter, the auger may be simply lowered away from the shaft 16. The connection 32, 33 not only prevents the auger from falling during installation and removal but also safeguards against falling of the auger during operation.

I claim:

1. A dispensing mechanism comprising a drive shaft adapted to be rotated about an upright axis and having a lower end portion, an upright auger adapted to be driven by said shaft and having an upper end portion, one of said end portions comprising a shank, the other of said end portions comprising a sleeve sized to telescopically receive said shank, said shank and said sleeve having coacting means permitting said shank and said sleeve to telescope axially with one another when said shank and said sleeve are in a first angular orientation relative to each other and acting to axially connect said shank and said sleeve in telescoped relation when said shank and said sleeve are in a second angular orientation relative to each other, each of said shaft and said auger having external drive means thereon, and means for drivingly coupling said shaft to said auger when said shank and sleeve are in said second angular orientation and selectively releasable to permit said shank and sleeve to be placed in said first angular orientation and thereby enable said auger to be disconnected axially from said shaft, said coupling means comprising a tube telescoped slidably over one of said shaft and said auger and having internal drive means, said tube normally being located in an active position in which the internal drive means of said tube engage the external drive means of both said shaft and said auger to couple the shaft and auger against relative rotation, and said tube being selectively slidable to an inactive position in which the internal drive means of said tube release the external drive means of one of said shaft and auger to permit relative turning of said auger and said shaft.

2. A dispensing mechanism as defined in claim 1 in which said shank is on the lower end portion of said shaft and in which said sleeve is on the upper end portion of said auger, the external drive means on said shaft comprising a male polygonal driving surface on said shaft, the external drive means on said auger comprising a male polygonal driving surface on the exterior of said sleeve, and the internal drive means of said tube comprising a female polygonal driving surface in the interior of said tube and shaped to couple drivingly with polygonal surfaces of said shaft and said sleeve.

3. A dispensing mechanism as defined in claim 2 in which each of said polygonal drive surfaces defines a square.

4. A dispensing mechanism as defined in claim 1 in which said coacting means comprise a generally T-shaped slot in said shank and further comprise a pin fixed to and extending radially inwardly from said sleeve, said slot having a lower stem opening axially out of the lower end of said shank and having a cross portion at the upper end of the stem and extending transversely of said stem, said pin being movable axially within said stem when said shank and said sleeve are in said first angular orientation and being captivated in said cross portion when said shank and said sleeve are in said second angular orientation.

5. A dispensing mechanism comprising a drive shaft adapted to be rotated about an upright axis and having a lower end portion defined at least in part by an elongated shank, an upright auger adapted to be driven by said shaft and having an upper end portion defined at least in part by a sleeve sized to telescopically receive said shank, a slot in said shank, a pin projecting radially inwardly from said sleeve, said slot slidably receiving said pin and permitting said sleeve to telescope onto said shank when said sleeve is in a first angular orientation relative to said shank, said slot axially captivating said pin and holding said sleeve in telescoped relation with said shank when said sleeve is in a second angular orientation relative to said shank, each of said shaft and said auger having a male polygonal drive surface, and means for drivingly coupling said shaft to said auger when said sleeve is in said second angular orientation and selectively operable to permit said sleeve to be placed in said first angular orientation and thereby enable said auger to be disconnected axially from said shaft, said coupling means comprising a tube telescoped slidably over said shaft, the interior of said tube having a female polygonal drive surface, said tube normally being located in an active position in which the female polygonal drive surface of said tube telescopes over and engages the male polygonal drive surfaces of said shaft and said auger to couple the shaft and the auger against relative rotation with said sleeve being held in said second angular orientation, and said tube being selectively slidable to an inactive position in which the female polygonal drive surface of the tube is disengaged from the male polygonal drive surface of the auger thereby to permit said sleeve to be turned relative to said shaft and to said first angular orientation.

* * * * *